No. 732,154. PATENTED JUNE 30, 1903.
M. BARR.
MACHINE ENGRAVING.
APPLICATION FILED MAR. 3, 1902.
NO MODEL.
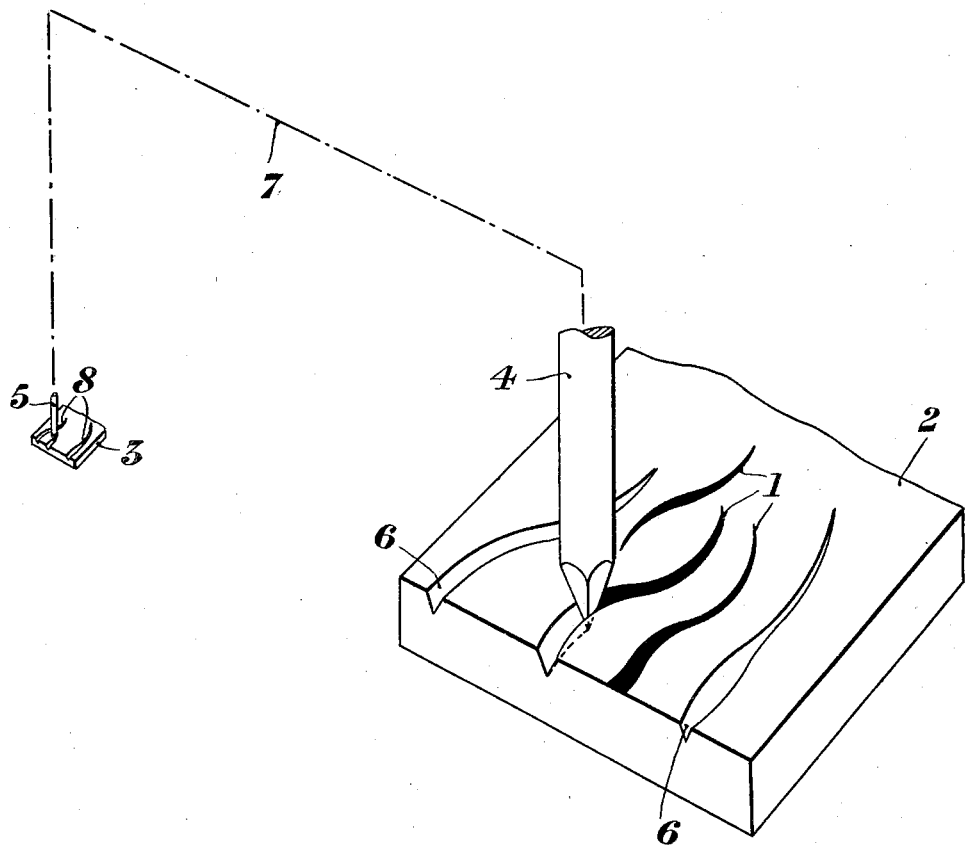
Witnesses
Horace Grellier
Frederic J. Birdy
Inventor
Mark Barr
per Chas. S. Woodroffe
Attorney No. 732,154. Patented June 30, 1903.

UNITED STATES PATENT OFFICE.

MARK BARR, OF KENSINGTON, ENGLAND, ASSIGNOR TO THE LINOTYPE COMPANY, LIMITED, OF LONDON, ENGLAND.

MACHINE-ENGRAVING.

SPECIFICATION forming part of Letters Patent No. 732,154, dated June 30, 1903.

Application filed March 3, 1902. Serial No. 96,511. (No model.)

*To all whom it may concern:*

Be it known that I, MARK BARR, residing at No. 25 Kensington Court Gardens, Kensington, in the county of Middlesex, England, have invented certain new and useful Improvements in Machine-Engraving, of which the following is a full, clear, and exact description, such as will enable others skilled in the art to which it appertains to make and use the same.

This invention relates to improvements in machine-engraving, and has for its objects to enable an operator to produce a line-engraving with lines of gradually-varying depth and thickness without necessitating the employment therefor of a specially-cut pattern such as has generally been used for the purpose and the quality of which engraving shall be equal or superior to the best hand-cut work. The cutting of the above-named pattern has hitherto necessitated the employment of highly-skilled labor and has therefore proved to be a very expensive operation. By mechanically engraving in accordance with the present invention the necessity for this expense is entirely overcome, and although, if such be desired, the resultant engraving may be identical with the original the operator has means at his command whereby he can vary the treatment of the subject engraved according to requirements.

The invention may be said to consist, essentially, in having the pattern depicted upon the surface of a plate, block, or other body of a friable material, such as gypsum or plaster-of-paris, which can be readily cut away without presenting undue or excessive resistance and in effecting this cutting away of the pattern by means of a rotating cutting-tracer, which is manipulated by the operator to follow the pattern and the movements of which in all directions are transmitted homologously to the engraving-tool.

The improved engraving process constituting the subject of the present invention may be effected in any engraving-machine of the three-dimension type—that is to say, a machine whose tracer and tool have each a capacity for moving in three dimensions—viz., length, breadth, and depth or height—and wherein the tracer is provided with cutting edges and has rotary motion imparted to it.

The accompanying drawing, which is to be taken as part of this specification and read therewith, diagrammatically represents the manner in which the improved engraving is effected.

In carrying out the invention a much-enlarged photograph is taken of the plate or device to be reproduced, and this, as indicated at 1 in the drawing, is suitably transferred or affixed to a gypsum or equivalent plate or body 2, or, if the said plate or body 2 be provided with a suitable sensitized surface, the photograph may be taken directly onto it. This prepared plate or body 2 and the plate or body 3 to be engraved are then secured in their proper positions in an engraving-machine, which is provided with a rotating routing-tracer 4 as well as the usual rotating engraving-tool 5. (A suitable machine for this purpose is described in the specification of a separate patent application, Serial No. 96,509, of even date herewith.) At their cutting ends the routing-tracer 4 and engraving-tool 5 are usually of taper form, each homologous with the other, as hereinafter more particularly described, and indicated in the accompanying drawing; but it is to be understood that the tracer and tool may be of other than taper form. The operator then follows the line 1 of the pattern 2 with the rotating routing-tracer 4, which latter will thereby be caused to cut furrows 6 at all the parts so traversed. In the drawing two such furrows are represented as having already been cut and a third one is shown in course of being cut. According as the different parts of the line 1 are thicker or thinner the operator respectively lowers or raises the taper routing-tracer 4, so that it may penetrate more or less deeply into the pattern 2, and consequently by reason of its conicity cut a wider and deeper or narrower and shallower furrow, (as clearly indicated in the accompanying drawing,) the immediate object of the operator being to cut away all and no more than the lines 1 of the pattern 2. As all movements given by the operator to the routing-tracer 4 are homologously transmitted to the rotating engraving-tool 5, to which the said cutting-tracer is connected through the usual mechanism diagrammatically represented by the dotted lines 7, and as the cutting end of the engraving-tool 5 is in every respect homologous with that of the routing-tracer 4, it follows that the resultant engraving 8, executed by the said engraving-tool, must be an exact copy of the pattern 1 at the predetermined ratio of reduction.

When so desired, the operator may vary the treatment of the subject in hand by causing the cutting-tracer 4 to penetrate into the pattern block or body 2 more or less deeply than is justified by the width of the lines 1 of the pattern, and thereby correspondingly increase or decrease the width of the engraved lines 8. Further variation of treatment, moreover, may be secured by using an engraving-tool 5 and a cutting-tracer 4, which are not homologous with each other.

I claim—

1. A process of engraving by a three-dimension engraving-machine having a rotating routing-tracer, consisting in depicting the pattern on the surface of a friable body, subjecting the work to the action of the engraving-tool and the pattern to that of the routing-tracer and varying the cutting away of the work proportionately to the cutting away of the pattern.

2. A process of engraving by a three-dimension engraving-machine having a rotating routing-tracer and a rotating engraving-tool both of taper form, and each homologous with the other consisting in depicting the pattern on the surface of a friable body, subjecting the work to the action of the engraving-tool and the pattern to that of the routing-tracer and varying the cutting away of the surface of the work simultaneously with that of the pattern-body by varying the extent of penetration of the routing-tracer into the said body.

In testimony that I claim the foregoing as my invention I have hereunto signed my name in the presence of two subscribing witnesses.

MARK BARR.

Witnesses:
CHAS. S. WOODROFFE,
WARWICK HY WILLIAMS.